United States Patent
Chang

(10) Patent No.: US 10,789,447 B2
(45) Date of Patent: Sep. 29, 2020

(54) FINGERPRINT AUTHENTICATION METHOD AND ELECTRONIC DEVICE

(71) Applicant: Acer Incorporated, New Taipei (TW)

(72) Inventor: Yu-Min Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 181 days.

(21) Appl. No.: 15/992,205

(22) Filed: May 30, 2018

(65) Prior Publication Data

US 2019/0163951 A1    May 30, 2019

(30) Foreign Application Priority Data

Nov. 28, 2017   (TW) .............................. 106141447 A

(51) Int. Cl.
*G06F 21/00* (2013.01)
*G06K 9/00* (2006.01)
*G06F 21/32* (2013.01)

(52) U.S. Cl.
CPC ......... *G06K 9/00026* (2013.01); *G06F 21/32* (2013.01); *G06K 9/00087* (2013.01)

(58) Field of Classification Search
CPC . G06K 9/00026; G06K 9/00087; G06F 21/32
See application file for complete search history.

(56) References Cited

U.S. PATENT DOCUMENTS

| | | | |
|---|---|---|---|
| 6,314,196 B1 | 11/2001 | Yamaguchi et al. | |
| 8,312,660 B1* | 11/2012 | Fujisaki | F41A 17/08 42/70.01 |
| 9,471,765 B1* | 10/2016 | Setterberg | G06K 9/00026 |
| 2008/0013804 A1 | 1/2008 | Moon et al. | |
| 2008/0115981 A1* | 5/2008 | Bechtel | G06F 3/03545 178/19.01 |
| 2010/0061602 A1 | 3/2010 | Yamada | |
| 2011/0044513 A1* | 2/2011 | McGonagle | G06K 9/00087 382/124 |
| 2012/0250954 A1* | 10/2012 | Nada | G06K 9/00087 382/124 |
| 2013/0259330 A1* | 10/2013 | Russo | G06K 9/00013 382/124 |

(Continued)

FOREIGN PATENT DOCUMENTS

| | | |
|---|---|---|
| TW | I229296 | 3/2005 |
| TW | 201044282 | 12/2010 |

(Continued)

*Primary Examiner* — Mahfuzur Rahman
(74) *Attorney, Agent, or Firm* — JCIPRNET

(57) ABSTRACT

A fingerprint authentication method and an electronic device are provided. The fingerprint authentication method includes: performing a fingerprint enrollment operation through a fingerprint sensor and storing enrolled fingerprint information to a storage circuit; sensing to-be-authenticated fingerprint information through the fingerprint sensor in a fingerprint authentication operation; and performing a default function corresponding to an authentication success of the fingerprint authentication operation and updating the enrolled fingerprint information according to authenticated fingerprint information if a similarity between the to-be-authenticated fingerprint information and the enrolled fingerprint information conforms to a default condition.

7 Claims, 7 Drawing Sheets

(56) References Cited

U.S. PATENT DOCUMENTS

2015/0286855 A1* 10/2015 Neskovic ........... G06K 9/00087
                                                                    382/125
2016/0147987 A1   5/2016 Jang et al.
2017/0140192 A1*  5/2017 Lo .......................... G06K 9/001
2017/0344804 A1* 11/2017 Zhou .................. G06K 9/00006
2018/0129861 A1*  5/2018 Kim ........................ G06F 16/51

FOREIGN PATENT DOCUMENTS

| TW | 201115480 | 5/2011 |
| TW | 201525750 | 7/2015 |
| TW | I534717   | 5/2016 |
| TW | 201714117 | 4/2017 |
| TW | I595396   | 8/2017 |

* cited by examiner

FINGERPRINT AUTHENTICATION METHOD AND ELECTRONIC DEVICE

CROSS-REFERENCE TO RELATED APPLICATION

This application claims the priority benefit of Taiwan application serial no. 106141447, filed on Nov. 28, 2017. The entirety of the above-mentioned patent application is hereby incorporated by reference herein and made a part of this specification.

BACKGROUND

Technical Field

The disclosure relates to a fingerprint authentication method and an electronic device.

Description of Related Art

As fingerprint recognition techniques gradually become prevalent, fingerprint recognition techniques are commonly used in electronic devices such as laptops and smartphones to authenticate an owner to manage access to the electronic devices. Generally, after a fingerprint authentication mechanism is activated, a user is required to store his or her own fingerprint information to the electronic device in a fingerprint enrollment procedure to be used later as the basis for performing fingerprint authentication.

However, as a sensing area of a fingerprint sensor is designed to be smaller and smaller, it becomes difficult for the user to enroll complete fingerprint information in the fingerprint enrollment procedure. Moreover, once exiting the fingerprint enrollment procedure, the user cannot modify and/or extend the enrolled fingerprint anymore. In other words, if the user intends to update his or her fingerprint information, the user can only re-start the fingerprint enrollment procedure. Accordingly, the current fingerprint authentication mechanism obviously lacks flexibility in use.

SUMMARY

The disclosure provides a fingerprint authentication method and an electronic device that, after a fingerprint enrollment operation is completed, update enrolled fingerprint information according to authenticated fingerprint information successfully passing a fingerprint authentication operation, thereby enhancing operation convenience in a fingerprint authentication mechanism.

An embodiment of the disclosure provides a fingerprint authentication method for an electronic device including a fingerprint sensor and a storage circuit, the fingerprint authentication method including: performing a fingerprint enrollment operation through the fingerprint sensor and storing enrolled fingerprint information to the storage circuit; sensing to-be-authenticated fingerprint information through the fingerprint sensor in a fingerprint authentication operation; and performing a default function corresponding to an authentication success of the fingerprint authentication operation and updating the enrolled fingerprint information according to authenticated fingerprint information if a similarity between the to-be-authenticated fingerprint information and the enrolled fingerprint information conforms to a default condition.

Another embodiment of the disclosure provides an electronic device including a fingerprint sensor, a storage circuit, and a processor. The processor is coupled to the fingerprint sensor and the storage circuit. The processor is configured to perform a fingerprint enrollment operation through the fingerprint sensor and store enrolled fingerprint information to the storage circuit. The processor is further configured to sense to-be-authenticated fingerprint information through the fingerprint sensor in a fingerprint authentication operation. The processor is further configured to perform a default function corresponding to an authentication success of the fingerprint authentication operation and update the enrolled fingerprint information according to authenticated fingerprint information if a similarity between the to-be-authenticated fingerprint information and the enrolled fingerprint information conforms to a default condition.

Accordingly, one fingerprint enrollment operation is performed through the fingerprint sensor, and the enrolled fingerprint information is stored to the storage circuit. Afterwards, in the fingerprint authentication operation, the to-be-authenticated fingerprint information is sensed through the fingerprint sensor. If the similarity between the sensed to-be-authenticated fingerprint information and the stored enrolled fingerprint information conforms to the default condition, a default function corresponding to the authentication success of the fingerprint authentication operation is performed, and the enrolled fingerprint information is updated according to the authenticated fingerprint information, thereby enhancing operation convenience in the fingerprint authentication mechanism.

To provide a further understanding of the aforementioned and other features and advantages of the disclosure, exemplary embodiments, together with the reference drawings, are described in detail below.

DESCRIPTION OF THE EMBODIMENTS

Figure 1:
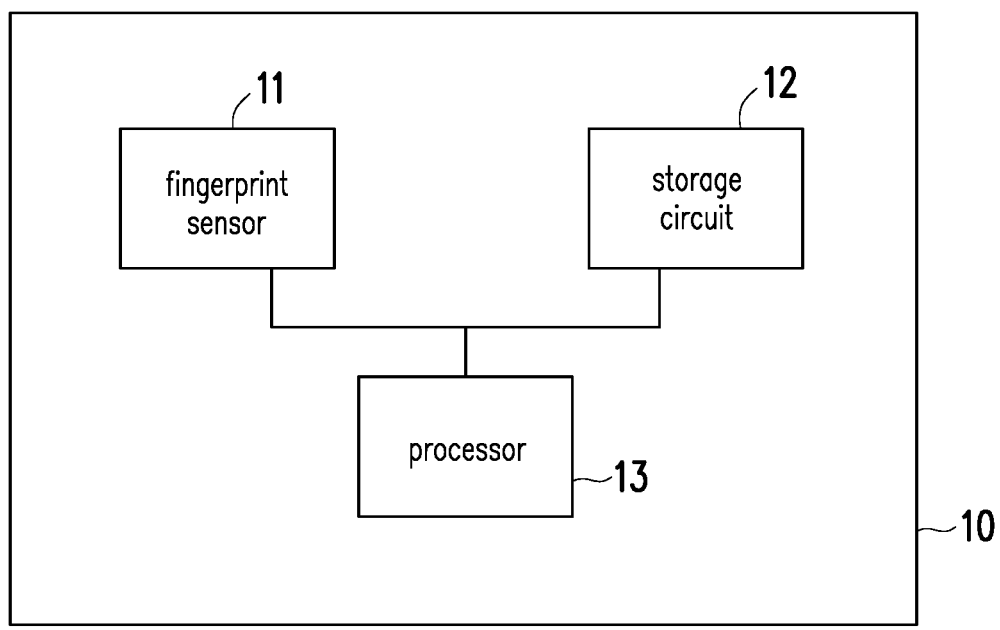
FIG. 1 is a schematic diagram illustrating an electronic device according to an exemplary embodiment of the disclosure.

FIG. 1 is a schematic diagram illustrating an electronic device according to an exemplary embodiment of the disclosure. Referring to FIG. 1, an electronic device 10 includes a fingerprint sensor 11, a storage circuit 12, and a processor 13. The fingerprint sensor 11 senses fingerprint information of a finger of a user. For example, the fingerprint sensor 11 may be a capacitive fingerprint sensor or an optical fingerprint sensor, but the disclosure does not limit the type of the fingerprint sensor 11. A fingerprint sensing mechanism of the fingerprint sensor 11 is, for example, swipe sensing or press sensing. If the fingerprint sensing mechanism of the fingerprint sensor 11 is swipe sensing, the user swipes the finger on a sensing surface of the fingerprint sensor 11, and the fingerprint sensor 11 senses the fingerprint information of the user through the sensing surface. Alternatively, if the fingerprint sensing mechanism of the fingerprint sensor 11 is press sensing, the user places the finger on the sensing surface of the fingerprint sensor 11, and the fingerprint sensor 11 senses the fingerprint information of the user through the sensing surface. To facilitate illustration, the fingerprint sensor 11 using swipe sensing is described in the following embodiments as an example.

The storage circuit 12 is configured to store information. For example, the storage circuit 12 includes various non-volatile storage circuits, such as a conventional hard disk (HDD), a solid state disk (SSD), and/or a flash memory. Therefore, information stored in the non-volatile storage circuit is not lost due to a power disconnection of the electronic device 10. For example, the storage circuit 12 stores information including enrolled fingerprint information and program codes required for operation of the electronic device 10. Moreover, the storage circuit 12 may also include a volatile storage circuit such as a random access memory (RAM) to store temporary information generated during operation of the electronic device 10.

The processor 13 is coupled to the fingerprint sensor 11 and the storage circuit 12. The processor 13 is, for example, a central processing unit (CPU), a programmable microprocessor for general or specific purposes, a digital signal processor (DSP), a programmable controller, an application specific integrated circuit (ASIC), a programmable logic device (PLD), another similar device, or a combination of the devices above.

In an embodiment, the processor 13 is only responsible for operations related to a fingerprint authentication mechanism, such as fingerprint sensing, fingerprint enrollment, fingerprint authentication, etc. In an embodiment, the processor 13 is further responsible for overall operation or other operations of the electronic device 10. In an embodiment, the electronic device 10 further includes an input/output (I/O) device and a power supply device. For example, the I/O device includes a mouse, a keyboard, a touch panel, a display, a touch screen, a microphone, a speaker, or a network interface card, and the type of the I/O device is not limited hereto. Moreover, the power supply device includes, for example, various power supply units or batteries.

In the description of the following embodiments, as an example, the electronic device 10 is a notebook computer. However, in another embodiment, the electronic device 10 may also be various electronic devices such as a smartphone, a tablet computer, a digital photo frame, a desktop computer, or an e-reader, and the disclosure is not limited hereto.

Figure 2:
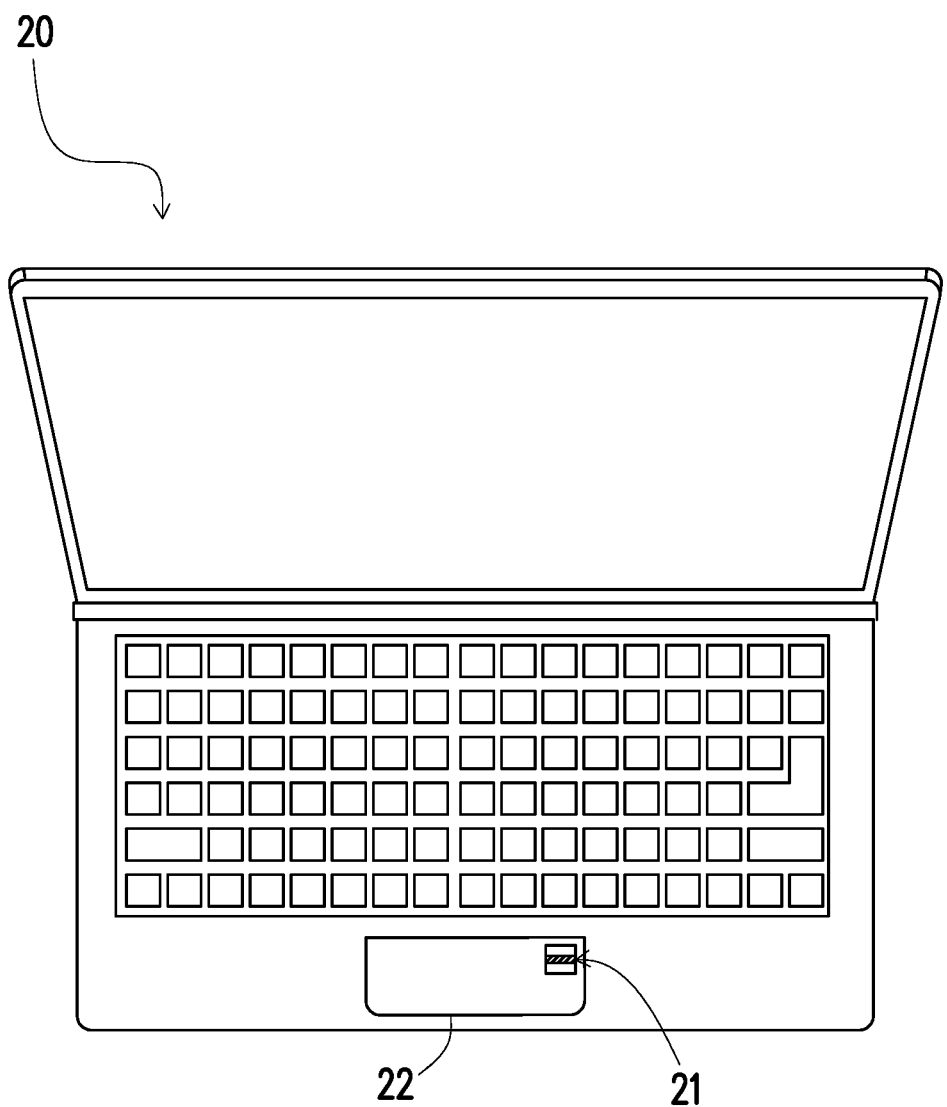
FIG. 2 is a schematic diagram illustrating an appearance of an electronic device according to an embodiment of the disclosure.
Figure 3:
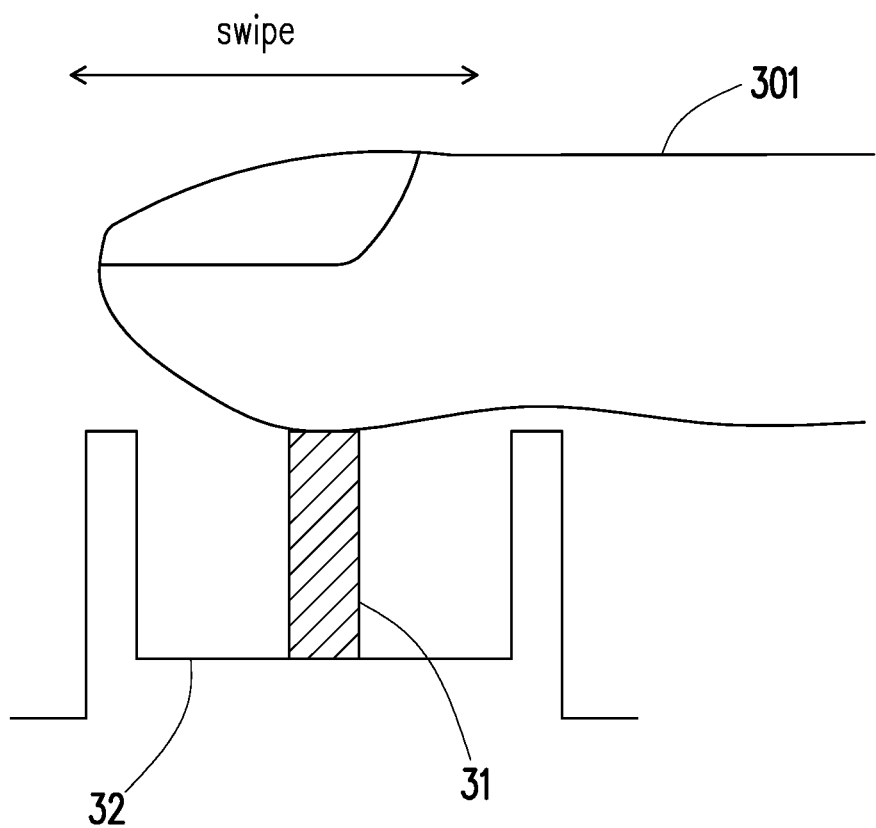
FIG. 3 is a schematic diagram illustrating swipe-type fingerprint sensing according to an embodiment of the disclosure.

FIG. 2 is a schematic diagram illustrating an appearance of an electronic device according to an embodiment of the disclosure. FIG. 3 is a schematic diagram illustrating swipe-type fingerprint sensing according to an embodiment of the disclosure. Referring to FIG. 2 and FIG. 3, an electronic device 20 is provided with a fingerprint sensor 21 and a touch panel 22. In the present embodiment, the fingerprint sensor 21 is disposed on the touch panel 22. However, in another embodiment, the fingerprint sensor 21 may also be disposed at another surface position of the electronic device 20, and the disclosure is not limited hereto. A sensing device 31 is disposed in a recess 32 of the fingerprint sensor 21. A finger 301 of the user contacts an upper surface of the sensing device 31 and is swiped back and forth on the upper surface of the sensing device 31. The sensing device 31 senses fingerprint information of the finger 301 that is being swiped.

Referring back to FIG. 1, the processor 13 performs a fingerprint enrollment operation and a fingerprint authentication operation. The fingerprint enrollment operation is configured to initially enroll fingerprint information of the user. For example, in the fingerprint enrollment operation, the processor 13 senses fingerprint information of a specific user through the fingerprint sensor 11 and matches the sensed fingerprint information with the specific user. Then, the processor 13 stores the sensed fingerprint information and relevant matching information to the storage circuit 12 to be used as enrolled fingerprint information. In an embodiment, the enrolled fingerprint information stored through the fingerprint enrollment operation is also referred to as initially enrolled fingerprint information. It is noted that, in the fingerprint enrollment operation, the processor 13 may also sense the fingerprint information of the specific user multiple times through the fingerprint sensor 11 and combine the sensed fingerprint information to generate the initially enrolled fingerprint information. After the fingerprint enrollment operation is completed, the enrolled fingerprint information may be used in the fingerprint authentication operation to authenticate an identity of a user currently operating the electronic device 10.

In the fingerprint authentication operation, the processor 13 senses fingerprint information (also referred to as to-be-authenticated fingerprint information) through the fingerprint sensor 11. The processor 13 compares the to-be-authenticated fingerprint information and the enrolled fingerprint information stored in the storage circuit 12 and determines whether a similarity between the to-be-authenticated fingerprint information and the enrolled fingerprint information conforms to a default condition. If the similarity between the to-be-authenticated fingerprint information and the enrolled fingerprint information conforms to the default condition, the processor 13 determines that the sensed fingerprint information is successfully authenticated and performs a default function corresponding to an authentication success of the fingerprint authentication operation. In an embodiment, the successfully authenticated fingerprint information is also referred to as authenticated fingerprint information. However, if the similarity between the to-be-authenticated fingerprint information and the enrolled fingerprint information does not conform to the default condition, the processor 13 determines that the sensed fingerprint information is not successfully authenticated and does not perform the default function.

In an embodiment, the default function includes, for example, various application functions that are allowed to be executed (only) after a successful identity authentication, such as logging in a specific application procedure, online purchase, device unlocking, etc. In other words, the fingerprint authentication operation may serve as an alternative means to conventional password authentication. In an embodiment, the fingerprint authentication operation may be used together with a password authentication operation. For example, if the fingerprint authentication mechanism and the password authentication mechanism are both activated, the user needs to simultaneously pass the fingerprint authentication operation and the password authentication operation before he or she can control the processor 13 to perform the default function. In another embodiment, the fingerprint authentication operation may also be used in combination with various other authentication mechanisms such as face authentication and/or iris authentication, and the disclosure is not limited hereto.

In an embodiment, the processor 13 performs a fingerprint image comparison according to the to-be-authenticated fingerprint information and the enrolled fingerprint information to determine whether the similarity between the to-be-authenticated fingerprint information and the enrolled fingerprint information conforms to the default condition. For example, the processor 13 may compare the to-be-authenticated fingerprint information and the enrolled fingerprint information to obtain image overlap information. Then, the processor 13 may determine whether the similarity between the to-be-authenticated fingerprint information and the enrolled fingerprint information conforms to the default condition according to the image overlap information. The image overlap information reflects a degree of match between the to-be-authenticated fingerprint information and the enrolled fingerprint information. If the degree of match between the to-be-authenticated fingerprint information and the enrolled fingerprint information reflected by the image overlap information is higher than a default degree, the processor 13 determines that the similarity between the to-be-authenticated fingerprint information and the enrolled fingerprint information conforms to the default condition. Conversely, if the degree of match between the to-be-authenticated fingerprint information and the enrolled fingerprint information reflected by the image overlap information is not higher than the default degree, the processor 13 may determine that the similarity between the to-be-authenticated fingerprint information and the enrolled fingerprint information does not conform to the default condition.

Figure 4:
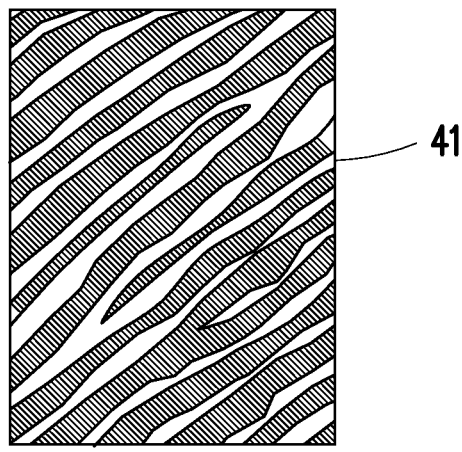
FIG. 4 to FIG. 6 are schematic diagrams illustrating a fingerprint image comparison according to an embodiment of the disclosure.
Figure 5:
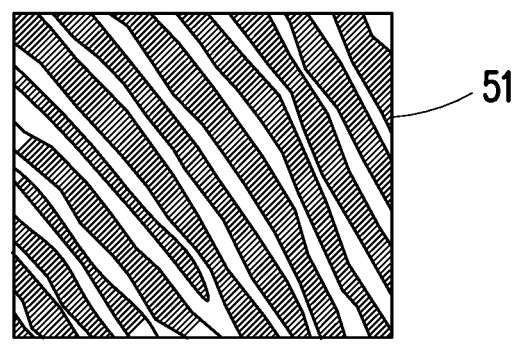
Figure 6:
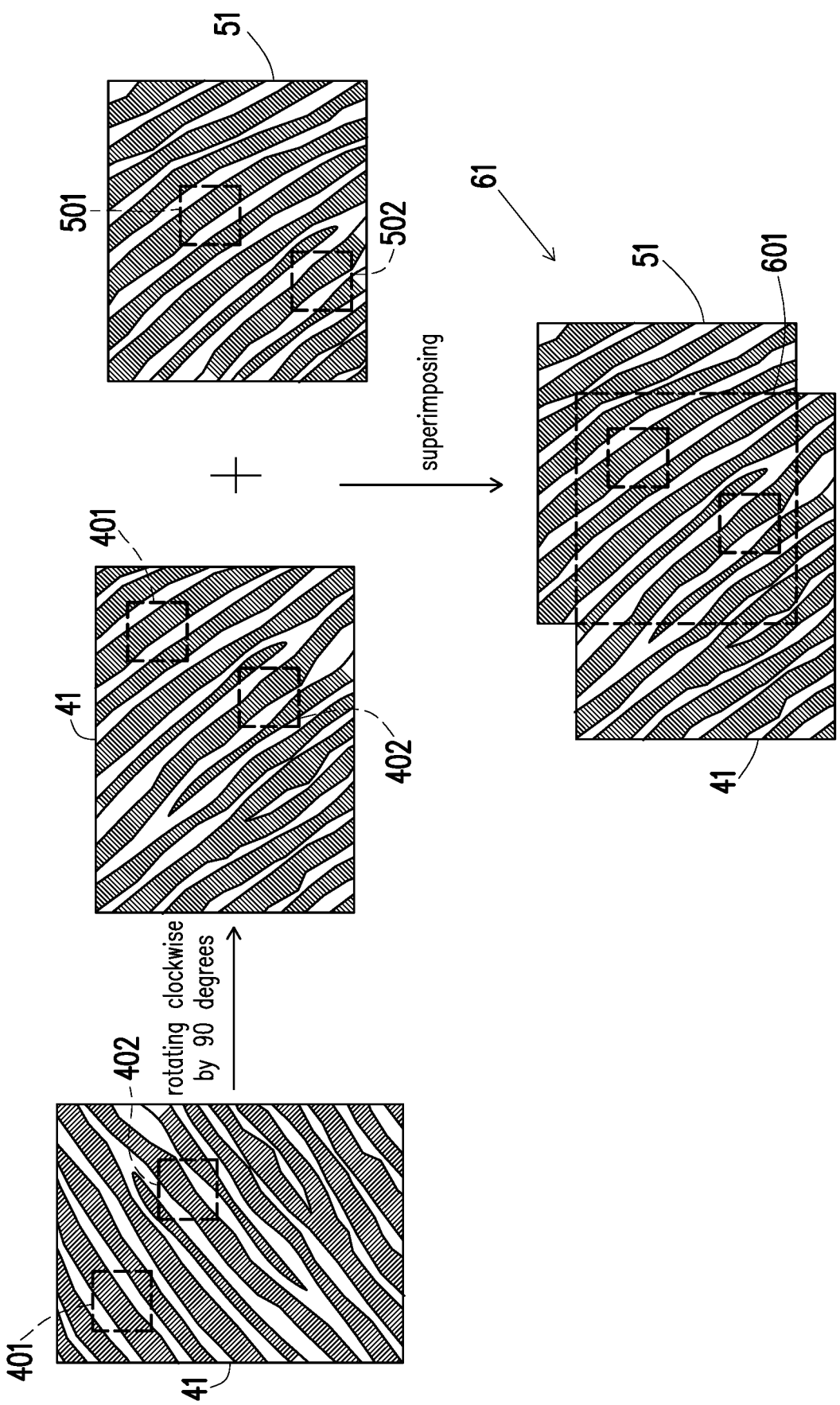

FIG. 4 to FIG. 6 are schematic diagrams illustrating a fingerprint image comparison according to an embodiment of the disclosure. Referring to FIG. 4 to FIG. 6, the processor 13 may convert the to-be-authenticated fingerprint information and the enrolled fingerprint information respectively into a to-be-authenticated fingerprint image 41 and an enrolled fingerprint image 51. After the fingerprint image comparison is performed, the processor 13 may obtain an image overlap region 601 between the to-be-authenticated fingerprint image 41 and the enrolled fingerprint image 51. In other words, the to-be-authenticated fingerprint information corresponds to the to-be-authenticated fingerprint image 41, the enrolled fingerprint information corresponds to the enrolled fingerprint image 51, and the image overlap information corresponds to the image overlap region 601 between the to-be-authenticated fingerprint image 41 and the enrolled fingerprint image 51.

In an embodiment, the processor 13 compares the to-be-authenticated fingerprint image 41 and the enrolled fingerprint image 51. According to a comparison result, the processor 13 sets at least two feature points respectively on the to-be-authenticated fingerprint image 41 and the enrolled fingerprint image 51. Taking feature points 401, 402 on the to-be-authenticated fingerprint image 41 and feature points 501, 502 on the enrolled fingerprint image 51 as an example, after the to-be-authenticated fingerprint image 41 is rotated clockwise by 90 degrees, an image content in a coverage of the feature point 401 is substantially identical to an image content in a coverage of the feature point 501, and an image content in a coverage of the feature point 402 is substantially identical to an image content in a coverage of the feature point 502. By rotating, by a specific degree, at least one of the to-be-authenticated fingerprint image 41 and the enrolled fingerprint image 51 and performing an image comparison, the processor 13 can determine the feature points 401, 402, 501, and 502.

After the feature points 401, 402, 501, and 502 are determined, the processor 13 causes the to-be-authenticated fingerprint image 41 and the enrolled fingerprint image 51 to at least partially overlap with each other according to the feature points 401, 402, 501, and 502 to obtain the image overlap region 601. For example, after the to-be-authenticated fingerprint image 41 is rotated clockwise by 90 degrees, the processor 13 positions the feature point 401 to the feature point 501 and positions the feature point 402 to the feature point 502 to thereby superimpose the to-be-authenticated fingerprint image 41 and the enrolled fingerprint image 51 to form a superimposed image 61. The processor 13 may recognize the image overlap region 601 in the superimposed image 61. In the image overlap region 601, an image content of the to-be-authenticated fingerprint image 41 is substantially identical to an image content of the enrolled fingerprint image 51. It is noted that being substantially identical as mentioned in the foregoing embodiment may mean being completely identical or being approximately identical considering errors caused by noise signals. In an embodiment, the processor 13 may also recognize the image overlap region 601 by using other image comparison techniques, and the disclosure is not limited hereto.

In an embodiment, the processor 13 determines whether an area of the image overlap region 601 is greater than a default area. If the area of the image overlap region 601 is greater than the default area, it means that the degree of match between the to-be-authenticated fingerprint information and the enrolled fingerprint information is higher than the default degree, and the processor 13 thus determines that the similarity between the to-be-authenticated fingerprint information and the enrolled fingerprint information conforms to the default condition. Conversely, if the area of the image overlap region 601 is not greater than the default area, it means that the degree of match between the to-be-authenticated fingerprint information and the enrolled fingerprint information is not higher than the default degree, and the processor 13 thus determines that the similarity between the to-be-authenticated fingerprint information and the enrolled fingerprint information does not conform to the default condition.

In an embodiment, the area of the image overlap region 601 is, for example, measured based on a number of pixels or a number of another unit of image. Moreover, although the image overlap region 601 is, as an example, a continuous region in the embodiment of FIG. 6, in another embodiment, the image overlap region 601 may also be discontinuous regions (for example, including a plurality of regions separate from each other). Alternatively, in another embodiment, the processor 13 may determine whether the similarity between the to-be-authenticated fingerprint information and the enrolled fingerprint information conforms to the default condition according to factors related to the image overlap region 601, e.g., whether a ratio of the area of the image overlap region 601 to a total area of the enrolled fingerprint image 51 is greater than a default ratio, and the disclosure is not limited hereto.

In an embodiment, if it is determined that the similarity between the to-be-authenticated fingerprint information and the enrolled fingerprint information conforms to the default condition, the processor 13 further updates the enrolled fingerprint information according to the successfully authenticated fingerprint information (i.e., the authenticated fingerprint information). For example, the processor 13 may filter out a portion of the fingerprint information (also referred to as first portion fingerprint information) in the authenticated fingerprint information and combines the enrolled fingerprint information and another portion of the fingerprint information (also referred to as second portion fingerprint information) in the authenticated fingerprint information.

Taking FIG. 6 as an example, after it is determined that the similarity between the to-be-authenticated fingerprint information and the enrolled fingerprint information conforms to the default condition, the processor 13 filters out a fingerprint image in the authenticated fingerprint image 41 that corresponds to the image overlap region 601 (i.e., the fingerprint image in the authenticated fingerprint image 41 that is included in the image overlap region 601) and combines the enrolled fingerprint image 51 and the remaining fingerprint image in the authenticated fingerprint image 41 (i.e., the unfiltered fingerprint image in the authenticated fingerprint image 41) to form a fingerprint image similar to the superimposed image 61. Moreover, in a combination operation of fingerprint images, the processor 13 may also perform operations including edge smoothing, image filling, etc., and the disclosure is not limited hereto. The fingerprint information (i.e., the updated enrolled fingerprint information) corresponding to the fingerprint image generated by the image combination above is stored to the storage circuit 12 to replace the enrolled fingerprint image 51 and is to be used in a next fingerprint authentication operation.

Figure 7:
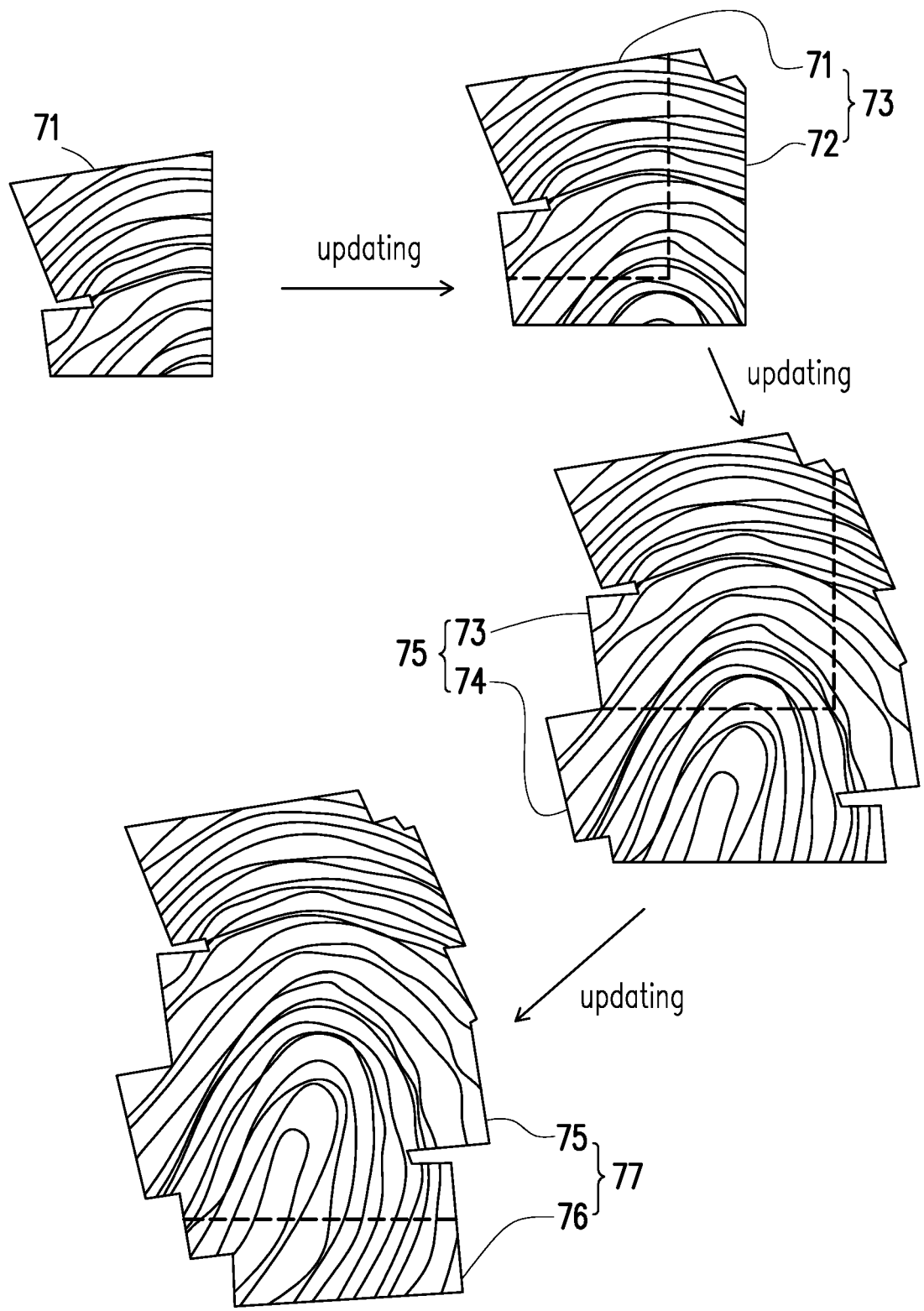
FIG. 7 is a schematic diagram illustrating updating enrolled fingerprint information according to an embodiment of the disclosure.

FIG. 7 is a schematic diagram illustrating updating enrolled fingerprint information according to an embodiment of the disclosure. Referring to FIG. 7, it is supposed that the enrolled fingerprint information corresponding to a fingerprint image 71 is enrolled and stored in the fingerprint enrollment operation. The fingerprint image 71 is also referred to as an initial fingerprint image. After a specific fingerprint authentication operation using the fingerprint image 71 is performed, the enrolled fingerprint information corresponding to the fingerprint image 71 is updated to enrolled fingerprint information corresponding to a fingerprint image 73. An area of the fingerprint image 73 is greater than an area of the fingerprint image 71. Compared to the fingerprint image 71, the fingerprint image 73 further includes a fingerprint image 72. For example, the fingerprint image 73 is obtained by combining the fingerprint image 71 and the fingerprint image 72. The enrolled fingerprint information corresponding to the fingerprint image 73 may be used in a next fingerprint authentication operation.

After the next fingerprint authentication operation using the fingerprint image 73 is performed, the enrolled fingerprint information corresponding to the fingerprint image 73 is updated to enrolled fingerprint information corresponding to a fingerprint image 75. An area of the fingerprint image 75 is greater than the area of the fingerprint image 73. Compared to the fingerprint image 73, the fingerprint image 75 further includes a fingerprint image 74. For example, the fingerprint image 75 is obtained by combining the fingerprint image 73 and the fingerprint image 74. The enrolled fingerprint information corresponding to the fingerprint image 75 may be used in a next fingerprint authentication operation. After the next fingerprint authentication operation using the fingerprint image 75 is performed, the enrolled fingerprint information corresponding to the fingerprint image 75 is updated to enrolled fingerprint information corresponding to a fingerprint image 77. An area of the fingerprint image 77 is greater than the area of the fingerprint image 75. Compared to the fingerprint image 75, the fingerprint image 77 further includes a fingerprint image 76. For example, the fingerprint image 77 is obtained by combining the fingerprint image 75 and the fingerprint image 76.

In other words, after the fingerprint authentication operation is successfully completed at least once, it is not required to re-perform the fingerprint enrollment operation, and the fingerprint information reflecting fingerprint at different positions on the same finger of the same user can be gradually collected and combined into new enrolled fingerprint information to enhance efficiency in performing the fingerprint authentication afterwards.

Figure 8:
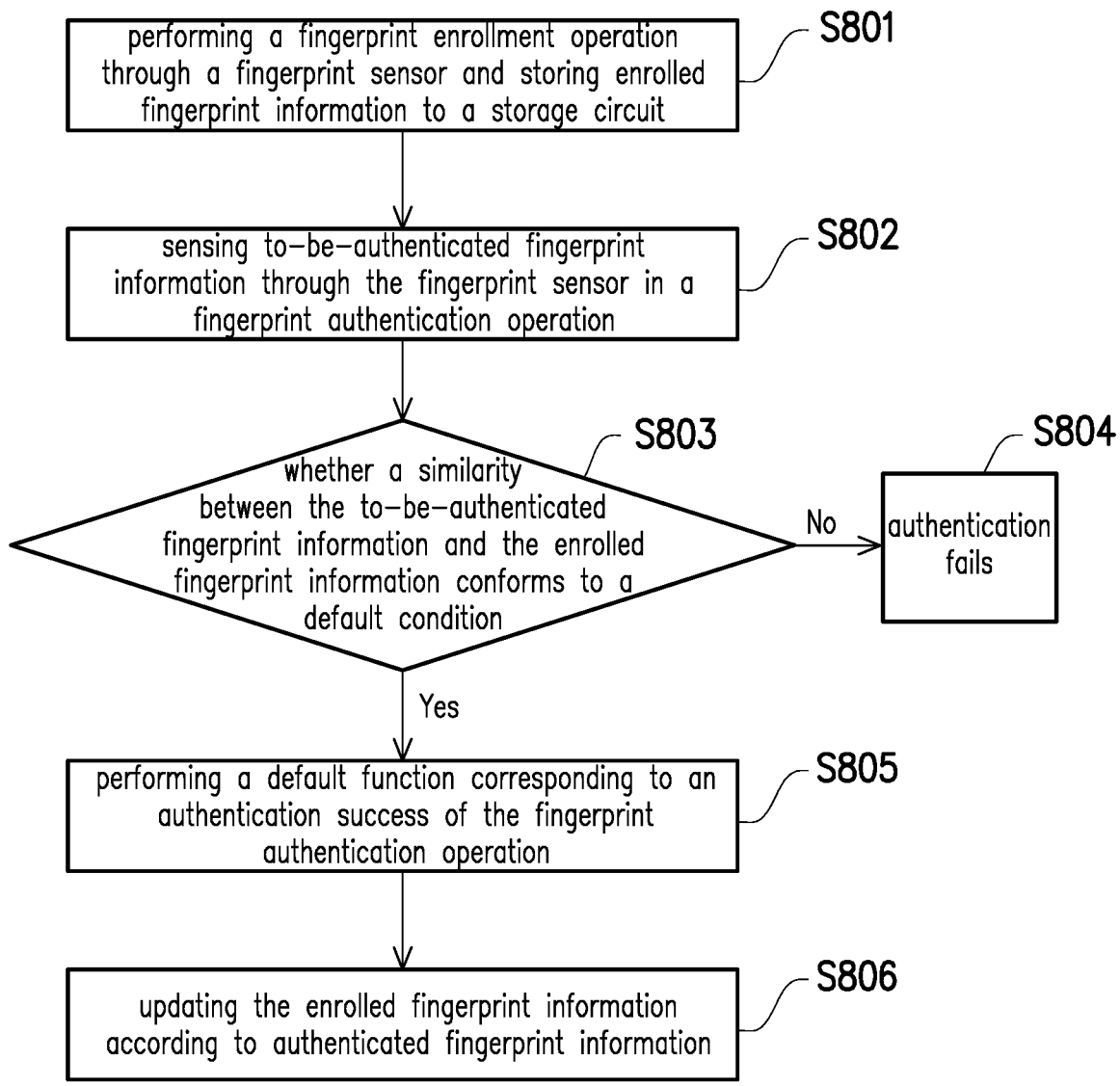
FIG. 8 is a flowchart illustrating a fingerprint authentication method according to an embodiment of the disclosure.

FIG. 8 is a flowchart illustrating a fingerprint authentication method according to an embodiment of the disclosure. Referring to FIG. 8, in step S801, a fingerprint enrollment operation is performed through a fingerprint sensor and enrolled fingerprint information is stored to a storage circuit. In step S802, to-be-authenticated fingerprint information is sensed through the fingerprint sensor in a fingerprint authentication operation. In step S803, it is determined whether a similarity between the to-be-authenticated fingerprint information and the enrolled fingerprint information conforms to a default condition. If the similarity between the to-be-authenticated fingerprint information and the enrolled fingerprint information does not conform to the default condition, in step S804, it is determined that authentication fails and a default function corresponding to an authentication success of the fingerprint authentication operation is not performed. However, if the similarity between the to-be-authenticated fingerprint information and the enrolled fingerprint information conforms to the default condition, in step S805, the default function corresponding to the authentication success of the fingerprint authentication operation is performed. In step S806, the enrolled fingerprint information is updated according to the authenticated fingerprint information.

The steps in FIG. 8 have been detailed described above and will not be repeatedly described here. It is noted that the steps in FIG. 8 may be implemented as a plurality of program codes or circuits, which is not limited in the disclosure. Moreover, the method of FIG. 8 may operate with the foregoing exemplary embodiments or operate on its own, which is not limited in the disclosure.

In summary of the above, after the fingerprint enrollment operation is completed, the (initial) enrolled fingerprint information is stored. Afterwards, during the user's operation of the electronic device, it is not required to re-perform the fingerprint enrollment operation, and the enrolled fingerprint information can still be automatically updated in the background as the user performs the fingerprint authentication operation each time. Moreover, by setting the update operation of the enrolled fingerprint information to be performed along with the fingerprint authentication operation, the fingerprint area required to be detected in the fingerprint enrollment operation is also reduced, and/or the count of detection of the fingerprint information performed in the fingerprint enrollment operation is reduced, which thereby accelerates execution of the fingerprint enrollment operation. Particularly, in a fingerprint sensor having a smaller sensing surface, since the fingerprint of the user can hardly be completely inputted in a rapid manner in the fingerprint enrollment operation, the effects of shortening the time for performing the fingerprint enrollment operation and enhancing an authentication success rate in a later fingerprint authentication operation as achieved in the disclosure become even more outstanding.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. A fingerprint authentication method for an electronic device comprising a fingerprint sensor and a storage circuit, the fingerprint authentication method comprising:

performing a fingerprint enrollment operation through the fingerprint sensor and storing enrolled fingerprint information to the storage circuit;

sensing to-be-authenticated fingerprint information through the fingerprint sensor in a fingerprint authentication operation; and performing a default function corresponding to an authentication success of the fingerprint authentication operation and updating the enrolled fingerprint information according to authenticated fingerprint information if a similarity between the to-be-authenticated fingerprint information and the enrolled fingerprint information conforms to a default condition, wherein the step of updating the enrolled fingerprint information according to the authenticated fingerprint information comprises:

filtering out a fingerprint image in an authenticated fingerprint image that corresponds to an image overlap region between a to-be-authenticated fingerprint image corresponding to the to-be-authenticated fingerprint information and an enrolled fingerprint image corresponding to the enrolled fingerprint information; and combining the enrolled fingerprint image and a remaining fingerprint image in the authenticated fingerprint image.

2. The fingerprint authentication method according to claim 1, further comprising:

comparing the to-be-authenticated fingerprint information and the enrolled fingerprint information to obtain image overlap information; and determining whether the similarity between the to-be-authenticated fingerprint information and the enrolled fingerprint information conforms to the default condition according to the image overlap information.

3. The fingerprint authentication method according to claim 2, wherein the image overlap information corresponds to the image overlap region between the to-be-authenticated fingerprint image and the enrolled fingerprint image, and the step of comparing the to-be-authenticated fingerprint information and the enrolled fingerprint information to obtain the image overlap information comprises:

comparing the to-be-authenticated fingerprint image and the enrolled fingerprint image;

setting at least two feature points respectively in the to-be-authenticated fingerprint image and the enrolled fingerprint image according to a comparison result; and rotating the to-be-authenticated fingerprint image or the enrolled fingerprint image based on the at least two feature points to obtain the image overlap region.

4. An electronic device comprising:

a fingerprint sensor;

a storage circuit; and a processor coupled to the fingerprint sensor and the storage circuit, wherein the processor is configured to perform a fingerprint enrollment operation through the fingerprint sensor and store enrolled fingerprint information to the storage circuit, the processor is further configured to sense to-be-authenticated fingerprint information through the fingerprint sensor in a fingerprint authentication operation, and the processor is further configured to perform a default function corresponding to an authentication success of the fingerprint authentication operation and update the enrolled fingerprint information according to authenticated fingerprint information if a similarity between the to-be-authenticated fingerprint information and the enrolled fingerprint information conforms to a default condition, wherein the operation of updating the enrolled fingerprint information according to the authenticated fingerprint information by the processor comprises:

filtering out a fingerprint image in an authenticated fingerprint image that corresponds to an image overlap region between a to-be-authenticated fingerprint image corresponding to the to-be-authenticated fingerprint information and an enrolled fingerprint image corresponding to the enrolled fingerprint information; and combining the enrolled fingerprint image and a remaining fingerprint image in the authenticated fingerprint image.

5. The electronic device according to claim 4, wherein the processor is further configured to compare the to-be-authenticated fingerprint information and the enrolled fingerprint information to obtain image overlap information, and the processor is further configured to determine whether the similarity between the to-be-authenticated fingerprint information and the enrolled fingerprint information conforms to the default condition according to the image overlap information.

6. The electronic device according to claim 5, wherein the image overlap information corresponds to the image overlap region between the to-be-authenticated fingerprint image and the enrolled fingerprint image, and the operation of comparing the to-be-authenticated fingerprint information and the enrolled fingerprint information to obtain the image overlap information by the processor comprises:

comparing the to-be-authenticated fingerprint image and the enrolled fingerprint image;

setting at least two feature points respectively in the to-be-authenticated fingerprint image and the enrolled fingerprint image according to a comparison result; and rotating the to-be-authenticated fingerprint image or the enrolled fingerprint image based on the at least two feature points to obtain the image overlap region.

7. A fingerprint authentication method for an electronic device comprising a fingerprint sensor and a storage circuit, the fingerprint authentication method comprising:

performing a fingerprint enrollment operation through the fingerprint sensor and storing enrolled fingerprint information to the storage circuit, wherein the enrolled fingerprint information corresponds to an enrolled fingerprint image;

sensing to-be-authenticated fingerprint information through the fingerprint sensor in a fingerprint authentication operation, wherein the to-be-authenticated fingerprint information corresponds to a to-be-authenticated fingerprint image;

comparing the to-be-authenticated fingerprint image and the enrolled fingerprint image;

setting at least two feature points respectively in the to-be-authenticated fingerprint image and the enrolled fingerprint image according to a comparison result;

rotating the to-be-authenticated fingerprint image or the enrolled fingerprint image based on the at least two feature points to obtain an image overlap region between the to-be-authenticated fingerprint image and the enrolled fingerprint image;

determining whether a similarity between the to-be-authenticated fingerprint information and the enrolled fingerprint information conforms to a default condition according to image overlap information corresponding to the image overlap region; and performing a default function corresponding to an authentication success of the fingerprint authentication operation and updating the enrolled fingerprint information according to authenticated fingerprint information if the similarity between the to-be-authenticated fingerprint information and the enrolled fingerprint information conforms to the default condition, wherein the step of updating the enrolled fingerprint information according to the authenticated fingerprint information comprises:

filtering out a fingerprint image in an authenticated fingerprint image that corresponds to the image overlap region; and combining the enrolled fingerprint image and a remaining fingerprint image in the authenticated fingerprint image.

* * * * *